No. 655,973. Patented Aug. 14, 1900.
R. HAKEWESSELL & E. C. HENN.
PIN CLUTCH MECHANISM.
(Application filed Dec. 9, 1899.)

(No Model.)

Witnesses
L. H. Blood.
M. H. Flynn.

Inventors
Reinhold Hakewessell and
Edwin C. Henn
by E. D. Whitney
Attorney.

THE NORRIS PETERS CO., PHOTO-LITHO., WASHINGTON, D. C.

UNITED STATES PATENT OFFICE.

REINHOLD HAKEWESSELL, OF HARTFORD, AND EDWIN C. HENN, OF BLOOMFIELD, CONNECTICUT.

PIN-CLUTCH MECHANISM.

SPECIFICATION forming part of Letters Patent No. 655,973, dated August 14, 1900.

Application filed December 9, 1899. Serial No. 739,776. (No model.)

*To all whom it may concern:*

Be it known that we, REINHOLD HAKEWESSELL, a resident of the city of Hartford, and EDWIN C. HENN, a resident of Bloomfield, in the county of Hartford and State of Connecticut, citizens of the United States of America, have invented certain new and useful Improvements in Pin-Clutch Mechanisms, of which the following is a specification.

This invention relates to that class of clutches generally known as "pin-clutches," the chief object of the present invention being to produce a pin-clutch of simplified and improved construction and organization that will be effective in its operation and one embodying means for cushioning the impact and to thereby obviate the injurious effect of such impact noticeable in pin-clutches of ordinary well-known construction and increase the working life of the clutch.

With this object in view the invention consists in certain novel features and in the combination and organization of the several features or parts, substantially as hereinafter described and more particularly pointed out in the claims.

Figure 1:
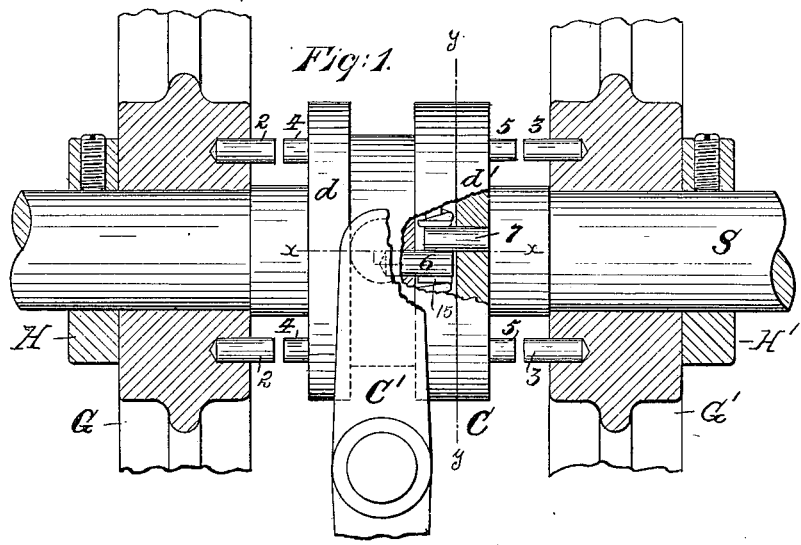
Figure 2:
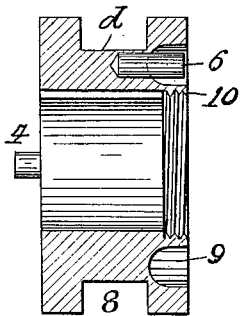
Figure 3:
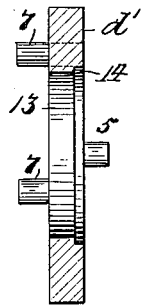
Figure 4:
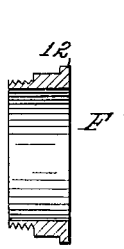
Figure 7:
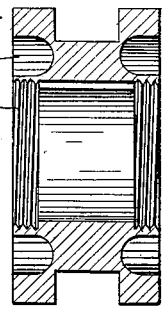
Figures 5, 6:
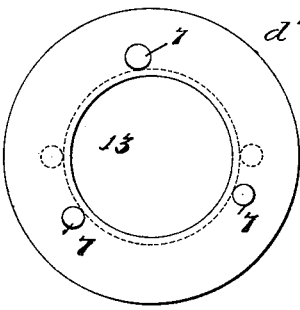

In the drawings accompanying and forming part of this specification, Figure 1 is an elevation, partly in section, of a pin-clutch mechanism embodying this invention. Fig. 2 is a longitudinal section of one part or member of the clutch, taken in a line corresponding with the dotted line $x$ $x$ in Fig. 1 as seen from below in said figure. Fig. 3 is a similar sectional view of another part of the clutch. Fig. 4 is a similar sectional view of the cap for securing the parts of the clutch and holding them in an assembled condition. Fig. 5 is a cross-sectional view of the clutch proper, taken on the dotted line $y$ $y$, Fig. 1, as seen from the right in said figure. Fig. 6 is a front view of the member shown in Fig. 3 as seen from the left in said figure, and Fig. 7 is a sectional view similar to Fig. 2 of a slightly-modified form of clutch member.

In Fig. 1 of the drawings the clutch mechanism as a whole comprises the clutch proper, which is designated in a general way by C and which is splined to a shaft S for a limited amount of longitudinal movement, a clutch-shifter C', two rotative members G and G', preferably gear-wheels loosely mounted on the shaft S, one at one side and the other at the other side of the clutch, and collars H and H' for holding the members G and G' against longitudinal movement on the shaft S.

In the construction and organization thereof shown in Fig. 1 the clutch proper, C, may constitute the driving element, in which case the shaft S will constitute the prime actuator and motion will be communicated to one or the other rotative gear-wheels G or G' through said clutch, or, if desired, one or the other gear-wheel G or G' may constitute the driving element, in which case some suitable or well-known actuating means (not shown) will constitute the prime mover and motion will be communicated through said gear-wheel to the clutch and thence to the shaft; but for convenience the clutch C will be hereinafter referred to as a "driven" element or device, assuming the gear-wheel G to be rotated by the prime motor (not shown) at a low speed and the wheel G' to be concurrently driven at a high rate of speed, motion being communicated to the shaft S through the clutch or driven element C in accordance with the speed of the gear in operative engagement with the clutch.

As shown in Fig. 1, the gears G and G' are provided on the inner faces of their hubs with clutch-pins 2 and 3, located in coöperative relation to corresponding clutch-pins 4 and 5 on the outer faces of the clutch C.

The clutch or driven member C, in the preferred construction and organization thereof, (shown most clearly in Figs. 1 to 6, inclusive,) comprises two principal members, (designated by $d$ and $d'$,) respectively secured together for a limited amount of rotative movement one relatively to the other, one or more springs $e$, disposed circumferentially about the coincident axes of said members, an abutment 6, secured to one member and bearing against one portion of a spring, and an abutment 7, fixed to the other member and bearing against an opposite portion of said spring, whereby on a movement of one member relatively to the other said spring will be slightly compressed, thereby to cushion the impact due to the engagement between the pins of the driven and driving elements, and a cap or fastening device F for holding the parts together.

The term "spring" is used herein as a matter of convenience; but it is distinctly to be understood that this term is to apply to any flexible, elastic, or compressible means which will constitute a cushioning means disposed between the two members to receive the impact or blow due to the engagement between the driven and driving members.

The fixed member $d$ of the clutch is shown as a sleeve circumferentially grooved intermediate its ends, as at 8, to receive the end of the shifter C' and has formed in one end face thereof, intermediate the inner and outer edges, an annular groove 9 to receive the cushioning-springs $e$ and is also internally screw-threaded at this end to receive the externally-screw-threaded end of the cap F, which supports the member $d'$ and secures the two members $d$ and $d'$ against longitudinal displacement relatively. This member $d$ will preferably be splined to the shaft to facilitate movement thereof longitudinally of said shaft and has three equidistantly-disposed abutments 6, shown as pins fixed in the recessed portion 9, parallel to the axis thereof. The other clutch member $d'$, which is supported for a limited amount of rotative movement with respect to the member $d$, is shown as a ring having a central opening 13, which is of slightly-greater diameter than the internal diameter of the member $d$ and which is shouldered at 14 to form a seat for the flange 12 of the cap F. This cap F, which is shown as a collar, has a stepped periphery and is externally screw-threaded at its inner smaller end to fit the internally-screw-threaded opening in the member $d$ and constitutes a support for the member $d'$, said member $d'$ being supported upon the middle portion of said cap F, between its flange 12 and the inner adjacent face of the member $d$ when the parts are assembled, and being held against movement longitudinally of the axis of the member by said flange 12, which bears against the shoulder 14. This member $d'$ is shown having a series of three equidistantly-disposed abutments or pins 7 located to enter the recess 9 in the face of the member $d$ and which normally have their side faces in close proximity to the adjacent side faces of the abutments 6 of said member.

When the parts $d$, $d'$, and F of the clutch C are assembled, the outer face of the cap F preferably lies flush with the corresponding face of the member $d'$.

The cushioning means, in the preferred form thereof shown, comprises a series of three spiral springs $e$, disposed about the sleeve of and in the annular groove in the member $d$ in such position that one end of each spring will bear against the abutment 6 of one member and the opposite end thereof will bear against the abutment 7 of the other member.

A headed pin 15 is shown inserted in each end of each spring to prevent undue lateral deflection and also to form a flat bearing for the abutments.

It will be obvious that opposite end faces of the member $d$ may be grooved, as shown in Fig. 7, and that both ends of the clutch may be of duplicate construction—that is, have cushioning means at both ends. Therefore it is not desired to limit the invention to the exact construction and organization shown in Figs. 1 to 6.

As before implied, both ends of the clutch will preferably be provided with pins to coöperate with the pins on the members driving said clutch or to be driven by said clutch.

We claim—

1. In a clutch mechanism a shaft; a rotative sleeve-like member mounted on said shaft and having an annular recess in one end between the inner and outer faces thereof; and also having a plurality of substantially-equidistant pins or abutments fixed in said recess; an axially-recessed cap having a peripheral flange at the outer end and having a diametrically-reduced externally-threaded inner end screwed into a corresponding bearing in the sleeve-like member; a ring mounted for rotative movement upon said collar and having a shoulder against which the inner face of said collar bears; and also having a plurality of abutment-pins fixed at their inner ends thereto and having their outer ends extending into the annular recess of the sleeve-like member; and a plurality of spiral springs supported in said recess and each bearing at one end against an abutment of the sleeve-like member and at the other end against an abutment of the ring, substantially as described.

2. In a clutch, the combination of an internally-screw-threaded sleeve-like member having an annular recess in one end intermediate the inner and outer faces thereof and also having fixed pins or abutments in said recess; a collar or cap fitting the screw-threaded end of said sleeve-like member and having a stepped periphery the middle step of which constitutes a bearing for a ring-like member and the outer step of which constitutes a holding-flange; a ring-like member mounted for a rotative movement upon the bearing of the cap and having a recess to receive the flange; pins or abutments fixed to the ring-like member and projecting into the annular recess of the sleeve-like member; and cushioning means disposed between the abutments of the two members, whereby one member may have a limited rotative movement with respect to the other.

3. A clutch mechanism comprising a shaft; a clutch-sleeve splined to said shaft and having an annular recess in the end intermediate the inner and outer faces thereof; pins fixed in said recess and substantially equidistant; a collar surrounding said shaft and having a reduced externally-screw-threaded inner end fitting a threaded portion of the central opening of the sleeve, and having a peripheral flange at the outer end thereof disposed somewhat in advance of the end face of said sleeve; a ring supported for rotative movements upon the collar between the flange and adjacent face of the sleeve and having one or more clutch-pins on the outer face thereof; a plurality of pins fixed to said collar and entering the annular recess in the sleeve; a coöperative clutch member loosely mounted upon the shaft; means for preventing longitudinal displacement of the clutch elements with respect to the shaft; and clutch-shifting means in connection with the clutch-sleeve and operative for effecting an engagement between the coöperative clutch members.

Signed by us at Hartford, Hartford county, Connecticut, this 7th day of December, A. D. 1899.

REINHOLD HAKEWESSELL.
EDWIN C. HENN.

Witnesses:
L. H. BLOOD,
E. C. WHITNEY.